UNITED STATES PATENT OFFICE.

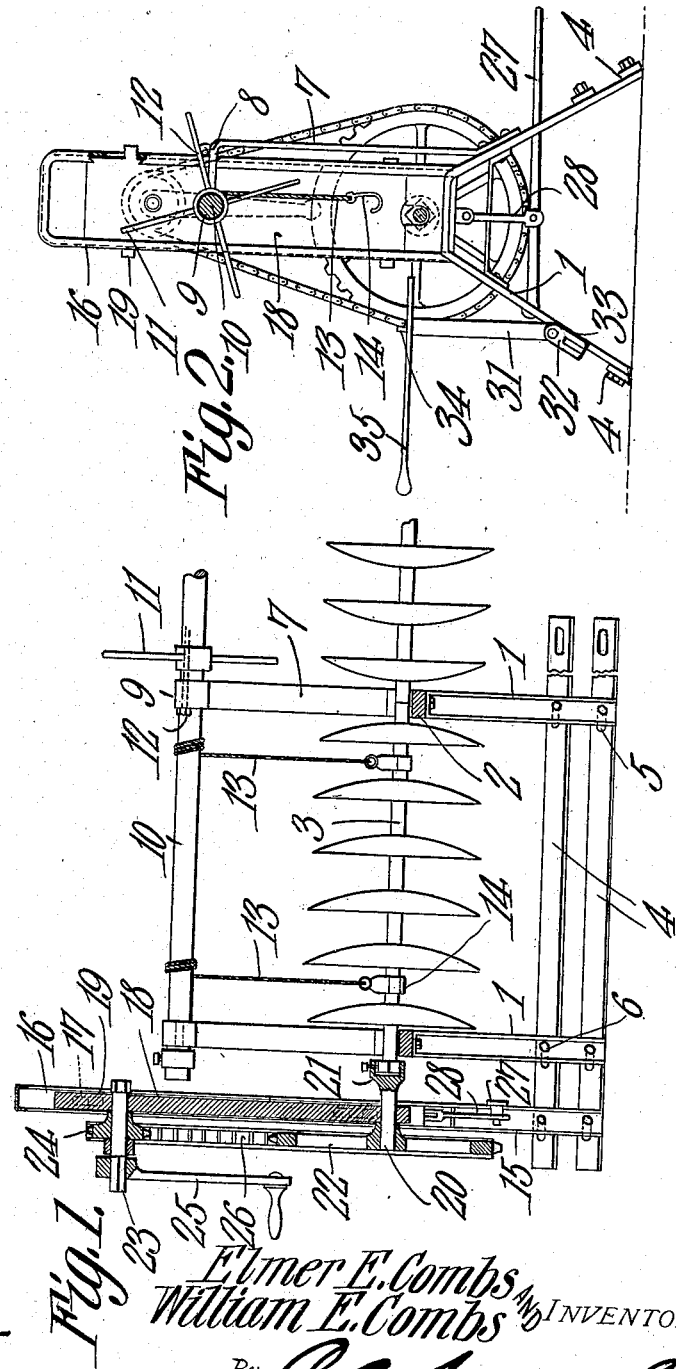

ELMER E. COMBS AND WILLIAM E. COMBS, OF EVANSVILLE, WISCONSIN; SAID WILLIAM E. COMBS ASSIGNOR TO SAID ELMER E. COMBS.

APPARATUS FOR SHARPENING DISKS AND COLTERS.

No. 900,707.  Specification of Letters Patent.  Patented Oct. 13, 1908.

Application filed April 29, 1907. Serial No. 370,894.

*To all whom it may concern:*

Be it known that we, ELMER E. COMBS and WILLIAM E. COMBS, citizens of the United States, residing at Evansville, in the county of Rock and State of Wisconsin, have invented a new and useful Apparatus for Sharpening Disks and Colters, of which the following is a specification.

This invention has relation to apparatus for sharpening disks and colters and it consists in the novel construction and arrangement of its parts as hereinafter shown and described.

The object of the invention is to provide an apparatus of the character indicated which is adapted to sharpen the cutting edges of disks or colters without requiring that they be removed from their supporting shafts.

With these and other objects in view the invention consists of certain novel features of construction and combinations of parts which will be hereinafter more fully described and pointed out in the claim.

In the accompanying drawings:—Figure 1 is a longitudinal sectional view of the apparatus. Fig. 2 is a transverse sectional view of the same.

The frame of the apparatus is made up of the substantially V-shaped standards 1 which are adapted to bear at their ends upon a floor or other support. The upper portions of the standards 1 are provided with the bearings 2. The said bearings are provided with concaved upper edges which are adapted to receive the shaft 3 of a gang of disks. The horizontal bars 4 connect the lower portion of the standards 1 together. The said bars are provided with elongated openings 5 which are adapted to receive the bolts 6 which pass transversely through the said standard. By this attaching means it is obvious that the said standards 1 may be shifted laterally with relation to each other in order to provide space for the reception of the disks mounted upon the shaft 3. The arms 7 are attached at their lower ends to the standards 1 and are provided at their upper portions with the angular extensions 8 which terminate in the bearings 9. The shaft 10 is journaled in the bearings 9 and is provided with the radiating hand-spikes or spokes 11. A pin 12 passes transversely through a lug provided upon one of the arms 7 and may be projected across the path of the spokes 11 and serve as a means for preventing the said spokes and shaft 10 from turning. The cables 13 are attached at their upper ends to the shaft 10 and are provided at their lower ends with the hooks 14. The standard 15 is attached to the end portions of the bars 4 and is provided with the vertically disposed parallel guides 16. The said guides are provided with the vertically disposed elongated openings 17.

The vertically adjustable plate 18 has its edges located within the guides 16. The said plate is provided with the lugs 19 which lie in the openings 17. The stub shaft 20 is journaled for rotation in the plate 18. Said shaft is provided at one end with the socket 21 which is adapted to receive and engage the end of the disk-shaft or a nut usually found at the end of such a shaft. The sprocket wheel 22 is fixed to the shaft 20. The shaft 23 is journaled to the plate 18 above the shaft 20. The sprocket wheel 24 is fixed to the shaft 23. The crank handle 25 is mounted upon the end of the shaft 23. The sprocket chain 26 passes around the sprocket wheels 22 and 24. The lever 27 is fulcrumed at one end to the standard 15 and is pivotally connected with the link 28 which in turn is pivotally connected with the plate 18. It is obvious that by moving the lever 27 the plate 18 and its attachments may be vertically adjusted in the guides 16 so that the socket 21 may be connected with the end of the shaft 3 and when so connected the plate 18 and its attachments are supported in an adjusted position by the shaft 3.

It is obvious that by passing the hooks 14 under a gang shaft and by winding the cables 13 upon the shaft 10 that the gang shaft 3, and in fact, the entire implement to which it is attached is lifted bodily and the shaft is deposited in the bearings 2. When so positioned the end of the shaft 3 may be connected up with the stub shaft 20 for rotation. The tool support consists of an upright 31 which is pivoted at its lower end to the block 32. Said block is provided with a groove 33 which is adapted to receive one of the horizontal bars 4. The upper end of the upright 31 is provided with a pin 34. This pin is designed to project into a suitable tool 35 which may be of any desired pattern and which is designed to swing upon the pin 4 so as to move into or out of engagement with the disk to be sharpened.

When the shaft 20 is coupled with the disk shaft 3 its longitudinal axis must be in alinement with the longitudinal axis of shaft 3 otherwise one or the other of the said shafts would have an eccentric movement while rotating. As the shafts 3 in different disk implements vary in diameter the plate 18 is made adjustable so that the shaft 20 may be brought in true alinement with the shaft 3 irrespective of the diameter of the latter. The link 28 connects the lever 27 with the plate 18 and said lever and link constitute the means for shifting or adjusting the plate 18. When the shaft 20 is coupled with the shaft 3 the weight of the said shaft 20 and its attachments is borne by the shaft 3.

Having described our invention what we claim as new and desire to secure by Letters Patent is:—

In a disk sharpener the combination with standards, a connecting bar thereon, and fixed open bearings on the standards; of parallel guides supported adjacent one of the standards, driving mechanism vertically adjustable in the guides and including a shaft having a socket, arms extending upward from the standards and a winding shaft journaled in the arms and supported above and in vertical alinement with the bearings, said bearings being disposed in alinement for holding a shaft parallel with the connecting bar.

In testimony that we claim the foregoing as our own, we have hereto affixed our signatures in the presence of two witnesses.

ELMER E. COMBS.
WILLIAM E. COMBS.

Witnesses:
E. H. PHILLIPS,
MAE G. PHILLIPS.